C. A. READ.
Water Meter and Motor.

No. 227,576.  Patented May 11, 1880.

WITNESSES:
C. Neveux
C. Sedgwick

INVENTOR:
C. A. Read
BY Munn & Co
ATTORNEYS.

United States Patent Office.

CHARLES A. READ, OF BRIDGEPORT, CONNECTICUT.

WATER METER AND MOTOR.

SPECIFICATION forming part of Letters Patent No. 227,576, dated May 11, 1880.

Application filed February 11, 1880.

*To all whom it may concern:*

Be it known that I, CHARLES A. READ, of Bridgeport, Fairfield county, and State of Connecticut, have invented a new and useful Improvement in Water Meters and Motors, of which the following is a specification.

Figure 1:
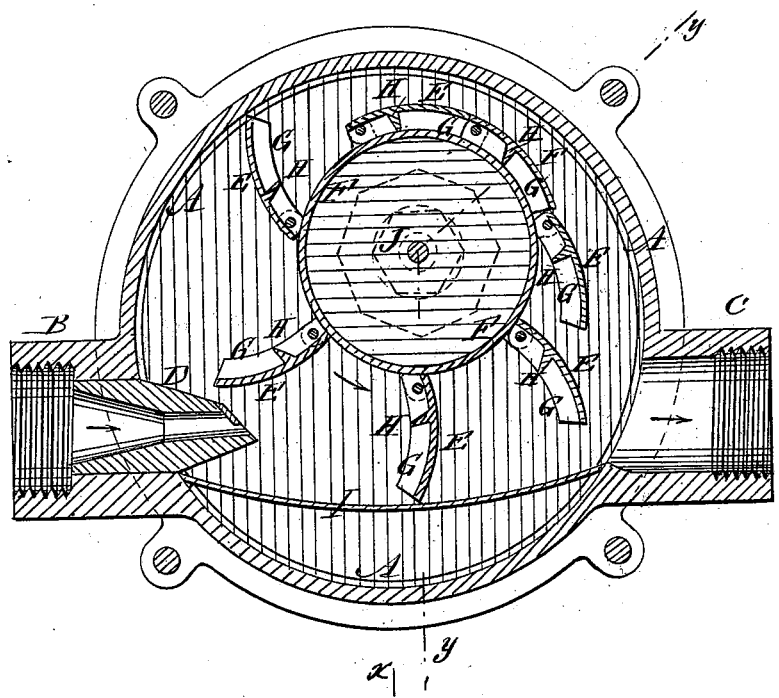
Figure 2:
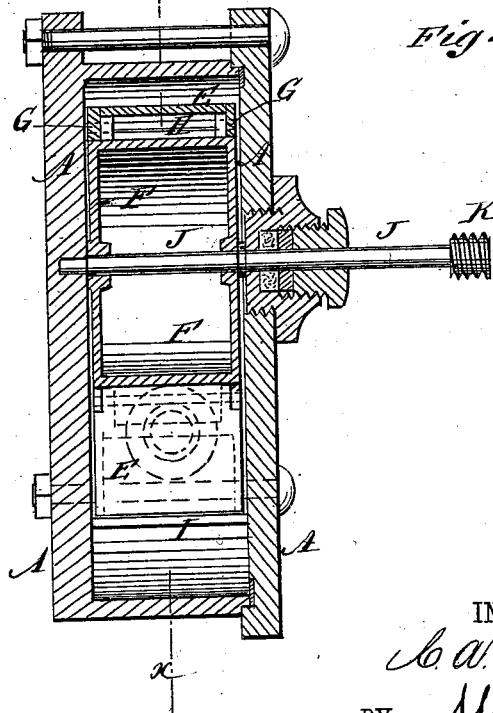

Figure 1 is a sectional side elevation of the improvement, taken through the line $x\ x$, Fig. 2; and Fig. 2 is a sectional elevation taken through line $y\ y$, Fig. 1.

Similar letters of reference indicate corresponding parts.

The object of this invention is to furnish rotary water meters and motors so constructed as to run with little friction, to be very sensitive to the least motion of the water, and to have very little leakage.

The invention consists in constructing a water meter and motor of a cylindrical shell having an inlet-pipe, an outlet-pipe, a tapering inwardly-projecting nozzle, and a cross-plate, a hollow cylinder attached to a shaft, and having peculiarly-constructed buckets hinged to it, as will be hereinafter fully described.

A represents the case or shell of the meter, which is made in the form of a short cylinder and provided with an inlet-pipe, B, and an outlet-pipe, C, located below the center of the cylinder A and in line with each other. The inlet-pipe B is provided with an inwardly-projecting tapering nozzle, D, to direct the inflowing stream of water more directly against the buckets E, which are hinged at one end to the shell of the hollow cylinder F. The buckets E are curved to fit upon the shell of the cylinder F, and have flanges G along the side edges of their concaved sides, and flanges H across their concave sides, at a little distance from their hinged ends.

The curvature of the buckets E and their flanges G H causes them to be very sensitive to the motion of the water and to utilize nearly the whole power of the water. Across the lower part of the case A is placed a plate, I, in such a position that the free ends of the buckets E may just touch it when at their lowest point, as shown in Figs. 1 and 2. The plate I being arranged to contact with the ends of buckets E, the nozzle D being projected within the meter to the circle of rotation of the outer ends of the buckets, and the middle of the buckets being in the axial line of the inlet and outlet pipes B C, the whole volume of water must strike the buckets, as shown in Fig. 1 of the drawings. As the buckets E pass up they feather themselves and lie closely upon the cylinder F while being carried over the said cylinder, as shown in Fig. 1. The buckets E are hinged to the cylinder F in such a manner that they cannot swing outward farther than to a radial position.

The cylinder A is made hollow, so that its buoyancy may lessen the friction of its journals. The cylinder F is attached to a shaft, J, which revolves in bearings in the heads of the shell A, which bearings are placed eccentrically, as shown in Figs. 1 and 2. One end of the shaft J projects, and to it is attached a worm, K, or other gear-wheel, to give motion to an indicator when the machine is used as a meter and to give motion to the machinery to be driven when the machine is used as a motor.

The advantage of the plate I is to regulate the shoot of the water and keep it up to the bucket, so that the whole of the water will exert its influence on the indicator, and thus be represented accurately by the meter.

I am aware that it is not new in water-meters to use between two sections of a water-pipe a box or receptacle in which is placed a rotary cylinder provided with curved and hinged buckets at intervals on its periphery; but

What I claim is—

The combination, with the shell A and the cylinder F, having hinged buckets E, of the curved plate I and the tapering nozzle D, projecting into the space between the said cylinder and plate, as and for the purpose specified.

CHARLES A. READ.

Witnesses:
 MORRIS W. SEYMOUR,
 C. E. WILMOT.